Feb. 10, 1942. W. S. COBEN 2,272,891
TIRE CONSTRUCTION
Filed May 13, 1939
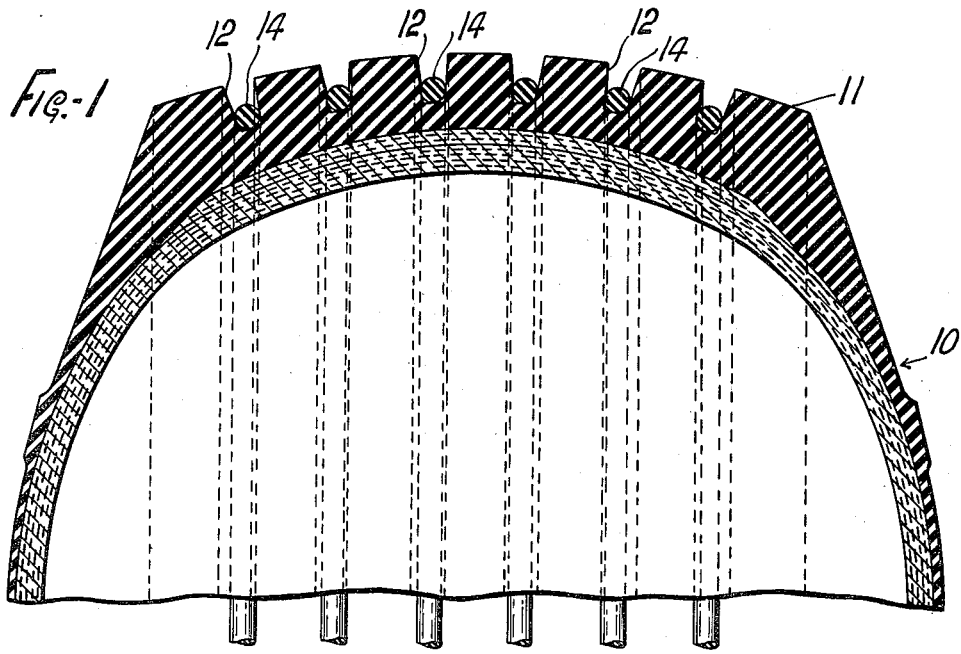
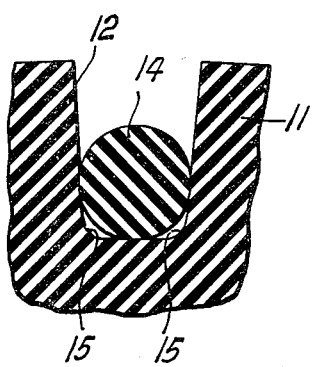
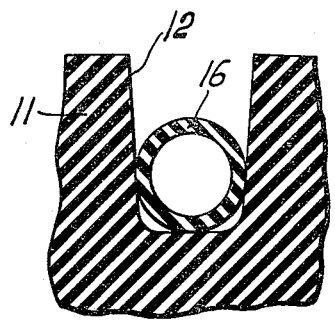
INVENTOR
WILLIAM S. COBEN
BY
ATTORNEYS Patented Feb. 10, 1942

2,272,891

UNITED STATES PATENT OFFICE 2,272,891

TIRE CONSTRUCTION

William S. Coben, Akron, Ohio, assignor to The Firestone Tire & Rubber Company, Akron, Ohio, a corporation of Ohio Application May 13, 1939, Serial No. 273,507

5 Claims. (Cl. 152—208)

This invention relates to tire constructions, and more especially it relates to resilient vehicle tires comprising means for ejecting pebbles and other objects from the grooves that form a part of the traction surface thereof.

The chief objects of the invention are to provide in a superior manner for effecting the ejection of pebbles and the like from the grooves in a tire tread, and for preventing their lodgement in said grooves; and to provide pebble-ejecting means for vehicle tires, which means may be utilized for providing the tire with a characteristic color scheme. Other objects will be manifest as the description proceeds.

Of the accompanying drawing:

Figure 1 is a fragmentary cross section through a pneumatic vehicle tire constituting one embodiment of the invention;

Figure 2 is a sectional detail thereof on a larger scale; and

Figure 3 is a fragmentary sectional detail of another embodiment of the invention.

Referring to the drawing, 10 designates generally the body of a pneumatic tire casing of any known or preferred construction, the tread portion thereof being designated 11. Said tread portion is formed with a plurality of endless circumferential grooves 12, 12 that define intervening ribs, which ribs constitute a part at least of the skid-resisting elements of the tread. The tread may include transverse grooves (not shown) if desired, but such grooves are not essential to the invention.

Mounted in each groove 12 is circumferentially extending element 14 of resilient rubber composition. The elements 14 may be endless, and be mounted in the grooves under tension so as to seat in the bottom of the latter. However, the elements 14 also may be retained in the grooves by means of cement, either with or without tension. As shown in Figures 1 and 2, the elements 14 are solid in section and of such size as to be disposed entirely well below the road-engaging surface of the tread 11. The elements 14 are shown as circular in section, but other shapes may be employed if desired, it being desirable, however, that the elements be of such shape as not completely to fill the bottoms of the grooves 11, whereby space such as shown at 15, Figure 2, is provided to enable flow or displacement of the element 14 under deforming pressure. Preferably the rubber composition of the elements 14 is of greater resilience than the tough, abrasion-resisting composition of the tire tread 11, so as to yield readily when passing over pebbles and the like, and thereafter to return to normal shape and eject any pebbles that may be wedged in the grooves 12.

The arrangement is such that the presence of the elements 14 does not materially alter the resilience of the tire 10, yet effectively prevents the lodgment of pebbles or the like in the grooves 12. Because of their resilience, the elements 14 also are adapted to assist in clearing said grooves of mud and snow, since they automatically restore themselves to normal shape after being deformed and thereby effect relative movement between material lodged in the grooves and the sides of the latter, thereby breaking the adhesion therebetween. The elements 14 lie sufficiently below the traction surface of the tire tread as not to affect the non-skid character of the latter. When the tire tread becomes sufficiently worn that the elements 14 come into contact with the roadway, they may be removed, if desired. It is contemplated that the elements 14 may be of contrasting color from the remainder of the tread structure, and thus to provide a distinctive color scheme for the tire.

The invention provides in an effective and facile manner for the cleaning of the circumferential grooves in the tread of a tire, and achieves the other advantages set out in the foregoing statement of objects.

In the embodiment of the invention shown in Figure 3 of the drawing the circumferential element, designated 16, that is mounted in the tread groove 12 is of hollow, tubular form. In other respects it is identical with the elements 14 and functions in the same manner as the latter.

Other modification may be resorted to without departing from the spirit of the invention, or the scope thereof as defined by the appended claims.

What is claimed is:

1. A pneumatic tire having a tread portion formed with a circumferential groove therein open to the surface thereof, and a separate element mounted in said groove and extending circumferentially of the tire, said element being disposed in its entirety well below the surface of the tread and having greater resilience than the adjacent tread structure.

2. A pneumatic tire having a tread portion of tough, abrasion-resisting rubber formed with a circumferential groove in the surface thereof, and a separate element mounted in said groove with its outermost surface appreciably below the surface of the tread and extending circumferentially of the tire, said element being composed of rubber composition of greater resilience than the rubber of the tread portion.

3. A pneumatic tire having a tread portion formed with a circumferential groove therein, and a separate element composed of resilient deformable material mounted in said groove with its outermost surface considerably below the surface of the tread and extending circumferentially of the tire, said element having a cross-sectional shape different from that of said groove and having circumferential contact with the sides and bottom of the latter only at spaced apart regions, thus providing space to facilitate deformation of said element within the groove under deforming stress.

4. A combination as defined in claim 3 in which the element in the groove is of circular cross-section and the groove is of non-circular cross-section.

5. A pneumatic tire having a tread portion formed with a circumferential outwardly open groove therein, and a resilient tubular structure mounted in said groove with its outermost surface considerably below the surface of the tread and extending circumferentially of the tire.

WILLIAM S. COBEN.